(12) United States Patent
Aboeloula et al.

(10) Patent No.: US 11,570,260 B1
(45) Date of Patent: Jan. 31, 2023

(54) DATA COLLECTION CONFIGURATION FILE GENERATION

(71) Applicant: Juniper Networks, Inc., Sunnyvale, CA (US)

(72) Inventors: Alaa Aboeloula, Acton, MA (US); Mayank Kiran Shah, North Chelmsford, MA (US); Dongxu Tian, Westford, MA (US); Girish Solur Virupakshaiah, Sunnyvale, CA (US); Arun Soman, Pleasanton, CA (US); Karthikeyan Sundaram, San Jose, CA (US); Ranpreet Singh, Santa Clara, CA (US); Alberto Sierra, Livermore, CA (US); Shijo Thomas, Sunnyvale, CA (US); Carlos Roberto Serrano Ferreira, Pembroke Pines, FL (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/948,733

(22) Filed: Sep. 30, 2020

(51) Int. Cl.
| | |
|---|---|
| *H04L 43/00* | (2022.01) |
| *H04L 67/00* | (2022.01) |
| *G06F 11/36* | (2006.01) |
| *H04L 41/14* | (2022.01) |
| *H04L 67/30* | (2022.01) |

(52) U.S. Cl.
CPC .......... *H04L 67/34* (2013.01); *G06F 11/362* (2013.01); *H04L 41/14* (2013.01); *H04L 67/30* (2013.01)

(58) Field of Classification Search
CPC ......... H04L 67/30; H04L 67/34; H04L 41/08; H04L 41/14; H04L 43/00; H04L 29/08; H04L 12/24; H04L 67/00; G06F 11/362; G06F 9/4416; G06F 11/36
USPC ........................................................ 709/223
See application file for complete search history.

(56) References Cited

U.S. PATENT DOCUMENTS

| | | | |
|---|---|---|---|
| 9,262,231 B2* | 2/2016 | Breternitz | ............. G06F 9/5083 |
| 9,565,076 B2 | 2/2017 | Degioanni et al. | |
| 10,122,783 B2 | 11/2018 | Qiao et al. | |

(Continued)

FOREIGN PATENT DOCUMENTS

WO 2012/174800 A1 12/2012

*Primary Examiner* — Tonia L Dollinger
*Assistant Examiner* — Mehulkumar J Shah
(74) *Attorney, Agent, or Firm* — Harrity & Harrity, LLP

(57) ABSTRACT

A network monitoring system may receive a configuration request to generate a configuration file associated with collecting feature or debug data associated with a feature, hardware, or software associated with a network device. The network monitoring system may determine a command profile associated with the feature, hardware, or software that identifies a set of commands associated with obtaining the feature or debug data from the network device. The network monitoring system may determine respective parameters of one or more commands of the set of commands. The network monitoring system may determine, based on the respective parameters, respective arguments of the one or more commands. The network monitoring system may generate the configuration file based on the respective arguments and may perform an action associated with the configuration file to permit the configuration file to be used to collect the feature or debug data from the network device.

20 Claims, 9 Drawing Sheets

(56) References Cited

U.S. PATENT DOCUMENTS

| | | | |
|---|---|---|---|
| 2011/0238792 A1* | 9/2011 | Phillips | G06F 15/177 |
| | | | 709/220 |
| 2012/0084758 A1* | 4/2012 | Bates | G06F 11/3656 |
| | | | 717/125 |
| 2018/0131751 A1* | 5/2018 | Jones | H04L 67/01 |
| 2018/0241813 A1* | 8/2018 | Funk | H04L 67/1068 |
| 2019/0034318 A1* | 1/2019 | Mariasin | G06F 11/3648 |
| 2019/0258756 A1* | 8/2019 | Minwalla | G06N 20/20 |
| 2020/0065210 A1* | 2/2020 | Idrisov | G06F 11/3433 |

\* cited by examiner

DATA COLLECTION CONFIGURATION FILE GENERATION

BACKGROUND

A network may include one or more network devices, such as one or more switches, one or more routers, one or more firewalls, and/or one or more gateways, among other examples. A performance of the network may be impacted by respective performances of the one or more network devices.

SUMMARY

In some implementations, a method includes receiving, by a device, a configuration request to generate a configuration file associated with collecting feature or debug data associated with a feature, hardware, or software associated with a network device; determining, by the device, a command profile associated with the feature, hardware, or software, wherein the command profile identifies a set of commands associated with obtaining the feature or debug data from the network device; determining, by the device and based on the configuration request, a collection scheme associated with collecting feature or debug data associated with the feature, hardware, or software, wherein the collection scheme is associated with an event that causes the feature or debug data to be collected from the network device; determining, by the device, respective parameters of one or more commands of the set of commands; determining, by the device and based on the respective parameters, respective arguments of the one or more commands; generating, by the device, the configuration file based on the respective arguments and the collection scheme; generating, based on the configuration file, one or more executable modules; and causing the feature or debug data to be collected from the network device based on executing the one or more executable modules.

In some implementations, a device includes one or more memories and one or more processors to: obtain a command profile associated with a feature, hardware, or software associated with a network, wherein the command profile identifies a set of commands associated with collecting, from a network device, feature or debug data associated with the feature, hardware, or software; determine, based on one or more characteristics of the feature, hardware, or software, respective parameters of one or more commands of the set of commands; determine, based on the respective parameters, respective arguments of the one or more commands; generate a configuration file based on the respective arguments and a collection scheme, wherein the collection scheme is associated with one or more events that cause the feature or debug data to be collected from the network device; determine, based on the respective arguments and the collection scheme, one or more tags associated with the feature, hardware, or software; and store, in a data structure, a mapping that associates the one or more tags and the configuration file.

In some implementations, a non-transitory computer-readable medium storing a set of instructions includes one or more instructions that, when executed by one or more processors of a device, cause the device to: obtain feature, hardware, or software information associated with a feature, hardware, or software of a network; determine, based on the feature, hardware, or software information, a command profile associated with collecting feature or debug data from a network device of the network, wherein the feature or debug data is associated with the feature, hardware, or software; determine, for a command of the command profile, a parameter of the command that corresponds to a characteristic of the feature, hardware, or software; determine, for the command and based on the parameter, an argument for collecting the feature or debug data from the network device; integrate the argument into a configuration file associated with the feature, hardware, or software to generate an updated configuration file; and deploy the updated configuration file to permit the updated configuration file to be used to collect the feature or debug data from the network device.

DETAILED DESCRIPTION

The following detailed description of example implementations refers to the accompanying drawings. The same reference numbers in different drawings may identify the same or similar elements.

A network may include one or more network devices, where each network device is associated with one or more features. A feature of a network device may include, for example, a type of the network device, a type of service provided by the network device, a type of network operation performed by the network device, a type of network metric associated with a performance of the network device, and/or a sequence of events following a failure scenario, among other examples. In a typical case, monitoring the respective features of the one or more network devices requires manual development of scripts on each of the network devices. This can be a resource intensive, time-consuming procedure that is susceptible to human error and efforts spent on a script is specific to a particular feature and does not extend to other features. Further, due to changing characteristics of the one or more network devices and/or features of the one or more network devices that are to be monitored, generating and/or updating scripts for individual network devices and/or for every feature is often impracticable.

Some implementations described herein provide a network monitoring system that generates a configuration file associated with collecting feature or debug data associated with a feature, hardware, or software associated with a network device. The network monitoring system may receive a request to generate the configuration file and determine, based on the request, a command profile that identifies a set of commands associated with obtaining the feature or debug data from the network device. The network monitoring system may generate the configuration file based on determining parameters and arguments of the set of commands. Accordingly, the network monitoring system may deploy the configuration file to permit the configuration file to be used to collect the feature or debug data from the network device.

In this way, the network monitoring system may automatically generate a configuration file (e.g., from a set of commands) to facilitate collection of feature or debug data associated with a feature, hardware, or software of a network device. The network monitoring system may generate a configuration file that is specific to the network device, without manual development by a network administrator. Accordingly, the network monitoring system eliminates an amount of time and computing resources (e.g., processing resources, memory resources, and/or power resources, among other examples) that would otherwise be required in order to manually develop individual scripts for monitoring respective features of a network device.

Figure 1A:
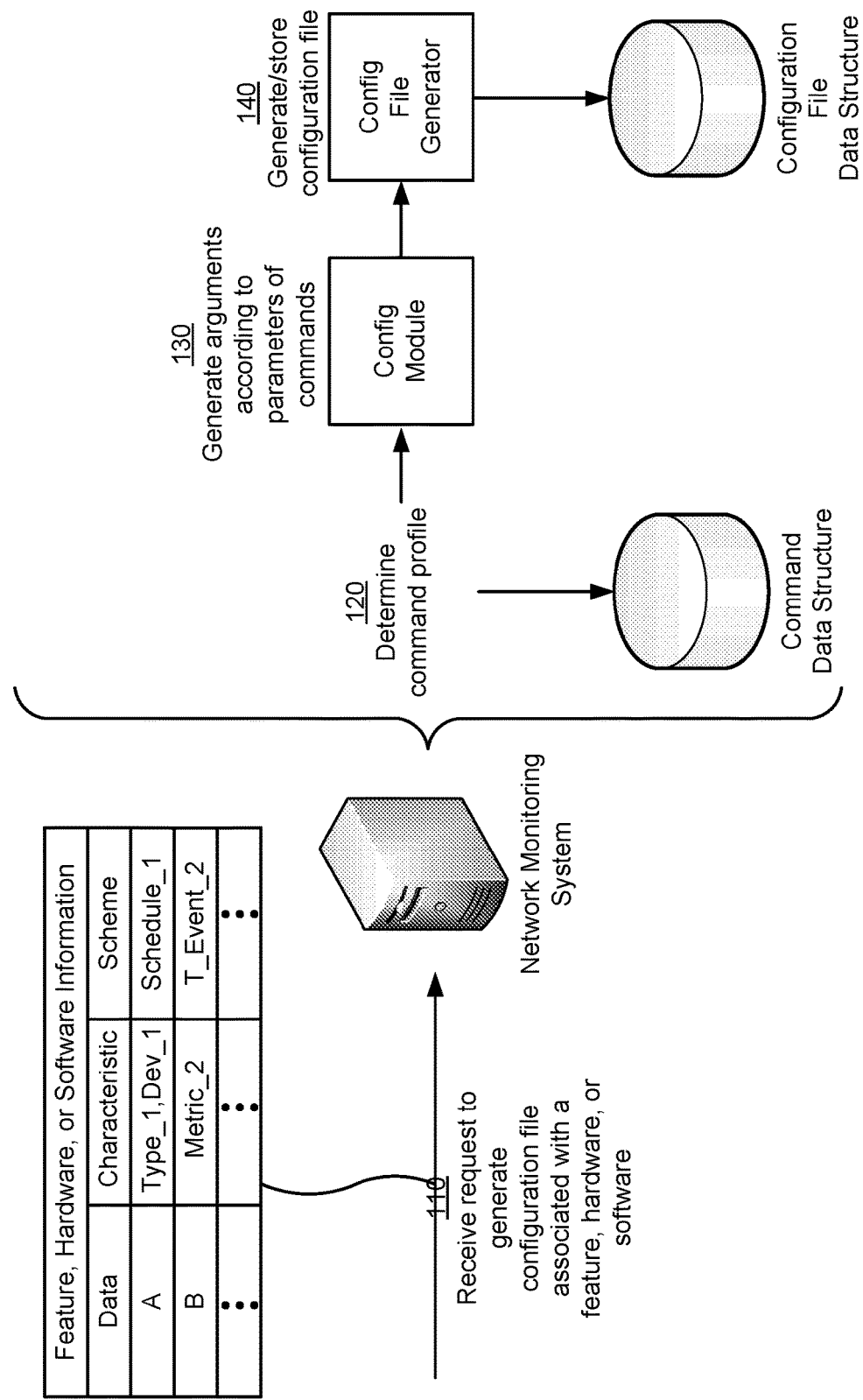
FIGS. 1A-1C are diagrams of an example implementation described herein.
Figure 1B:
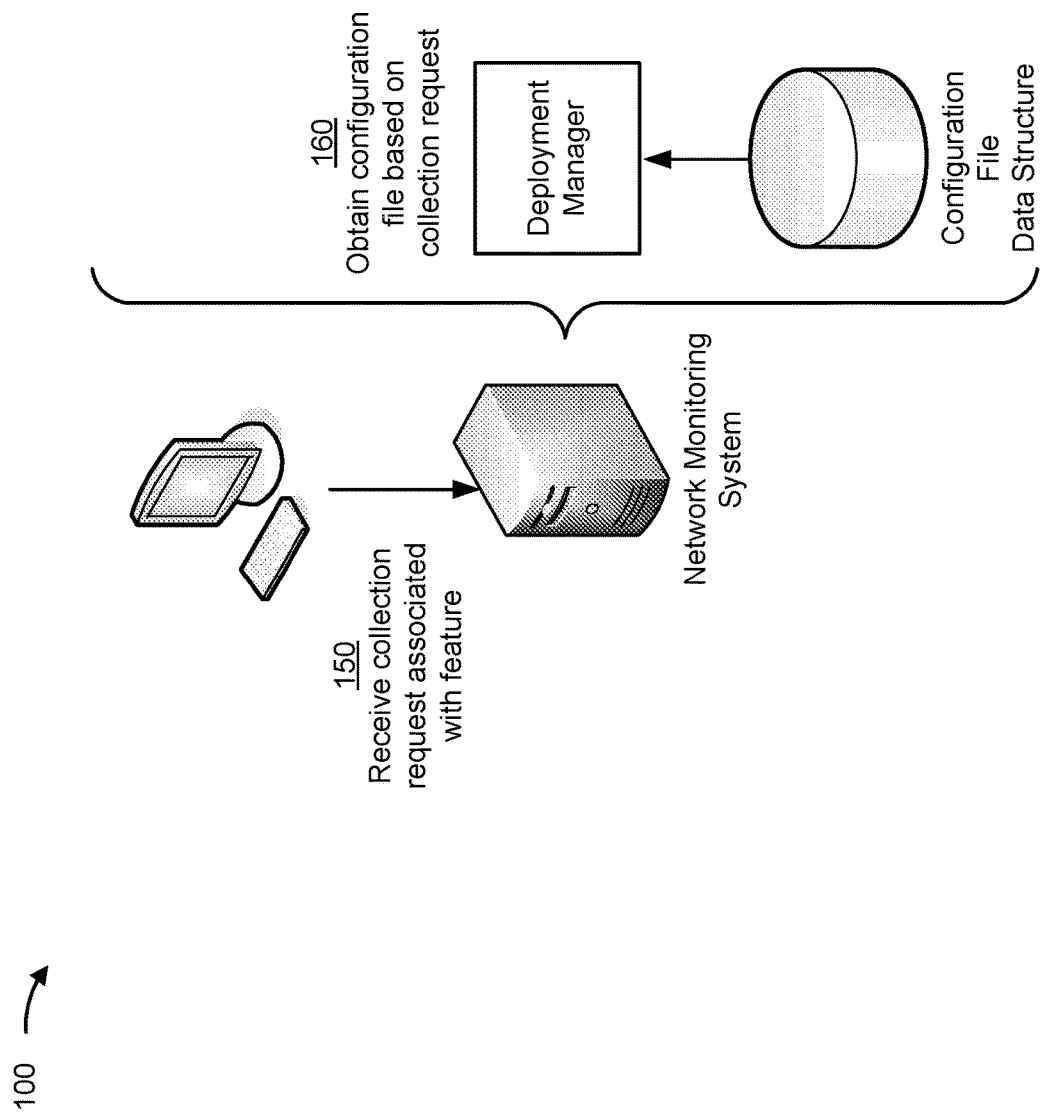

FIGS. 1A-1B are diagrams of an example 100 associated with generating a data collection configuration file. As shown in FIGS. 1A-1B, example 100 includes a network monitoring system and one or more network devices (shown in FIG. 1B as network devices 1 through N, N≥1). A network device, of the one or more network devices, may include a switch, a router, and/or a gateway, among other examples. As shown in FIG. 1B, the network device may be included in a network (e.g., with one or more other network devices), such as a cellular network, a local area network (LAN), a core network, an access network, a wide area network (WAN) such as the Internet, a cloud network, and/or the like.

Turning to FIG. 1A and reference number 110, the network monitoring system may receive (e.g., from another device, such as a user device) a request to generate a configuration file associated with a feature, hardware, or software of a network device and/or a network that is monitored by the network monitoring system. The feature, hardware, or software may be a particular type of the network device, a particular type of service provided by the network device (e.g., an authentication service, a security service, a routing service, and/or a load balancing service, among other examples), a particular type of network operation performed by the network device, a particular type of network metric associated with a performance of the network device, and/or a sequence of events following a failure scenario, among other examples. For example, as shown in the Feature, Hardware, or Software Information table in FIG. 1A, the network monitoring system may receive a request to generate a configuration file associated with a particular data type (shown as Type_1) associated with a particular type of network device (shown as Dev_1), a request to generate a configuration file associated with a particular type of network metric (shown as Metric_2), and so on. The configuration file (e.g., after the configuration file is generated by the network monitoring system, as described herein) may be used by the network monitoring system and/or a network device to collect feature or debug data (e.g. shown as Data A and/or Data B in the Feature, Hardware, or Software Information table) associated with the feature, hardware, or software indicated by the request.

In some implementations, a user may interact with a user interface of the network monitoring system and/or another device (e.g., a user device that communicates with the network monitoring system) to generate user input that is received by the network monitoring system. The user input may include a description of the feature, hardware, or software. For example, the description may indicate one or more characteristics of the feature, hardware, or software (e.g., one or more keywords associated with the feature, hardware, or software; guidance on how to interpret and/or use the feature or debug data; and/or the like). In some implementations, the description includes a document that describes the network device, a guide (e.g., a manual, a debugging guide, and/or a troubleshooting guide) associated with the network device, and/or specification information concerning the network device, among other examples. Additionally, or alternatively, the user input may include one or more tags associated with the feature, hardware, or software (e.g., that may be used by the network monitoring system to determine how to process and collect the feature or debug data based on a run time hardware/software state of the network device or feature, hardware, or software; to classify and/or store the configuration file; and/or the like, as described herein). The user input may be included as part of the request that is received by the network monitoring system, or may be received by the network monitoring system in association with the request (e.g., within a particular time window of receiving the request).

As further shown in FIG. 1A, and by reference number 120, the network monitoring system may determine a command profile associated with the feature, hardware, or software. In some implementations, the network monitoring system may process and/or analyze the request and/or the user input to determine the one or more characteristics of the feature, hardware, or software, and may determine the command profile based on the one or more characteristics. For example, as shown in FIG. 1A, the network monitoring system may search, based on the one or more characteristics, a command data structure (e.g., a storage device, such as a hard drive, a database, a network-attached storage (NAS), and/or the like, that is configured to store command profiles) for a command profile that is associated with the feature, hardware, or software. The command profile may identify a set of commands associated with obtaining the feature or debug data associated with the feature, hardware, or software of the network device and/or the state of the network and/or the network device or when isolating a state of events following a major event or failure in the network or on the network device (e.g., from the network device). For example, when the one or more characteristics are associated with a route supported by the network device, the network monitoring system may process the one or more characteristics to identify a command profile that includes a set of commands that are associated with collecting data concerning a route.

In some implementations, the network monitoring system may determine one or more parameters (also referred to as one or more variables) of a command, of the set of commands. In some implementations, the one or more parameters may correspond to the one or more characteristics of the feature, hardware, or software (e.g., a parameter, of the one or more parameters, may respectively correspond to a characteristic of the one or more characteristics). A parameter of the command may indicate a type of the network device, a location (e.g., a physical location and/or a virtual location) of the network device, an interface of the network device, a condition of the network device, a performance characteristic of the network device, run time values associated with other commands, and/or types of packet or network traffic, among other examples. In some implementations, the parameter may indicate a relationship between the parameter and one or more other parameters of the command and/or one or more other parameters of a different command of the set of commands. For example, the parameter may indicate a next hop of a route of the network device that may be related to a parameter associated with the interface of the network device.

In some implementations, the network monitoring system may determine a collection scheme associated with collecting the feature or debug data associated with the feature, hardware, or software (e.g., from the network device). The collection scheme may indicate an event for collecting the feature or debug data. For example, the collection scheme may indicate a schedule to collect the feature or debug data (e.g., the feature or debug data is to be collected every 2 seconds, every 10 seconds, every 30 seconds, or every 5 minutes, among other examples), a particular time to collect the feature or debug data (e.g., the feature or debug data is to be collected at 14:00 on the day the request is received), and/or a triggering condition to collect the feature or debug data (e.g., the feature or debug data is to be collected when the network device operates under a particular condition, such as the network device experiencing a failure, being overloaded, having certain performance characteristics, and/or the like), among other examples.

In some implementations, the user input (e.g., as described above) may include a description of the event. For example, the description may indicate the schedule to collect the feature or debug data, the particular time to collect the feature or debug data, and/or the triggering condition to collect the feature or debug data. In another example, as shown in the Feature, Hardware, or Software Information table in FIG. 1A, the user input may indicate that first feature or debug data (shown as Data A) is to be collected according to a schedule (shown as Schedule_1), or that second feature or debug data (shown as Data B) is to be collected according to a triggering condition (shown as T_Event_2). As described above, the user input may be included as part of the request that is received by the network monitoring system, or may be received by the network monitoring system in association with the request (e.g., within a particular time window of receiving the request). Accordingly, the network monitoring system may process and/or analyze the request and/or the user input to determine the collection scheme.

As further shown in FIG. 1A, and by reference number 130, the network monitoring system may generate, or prompt a user to input, one or more arguments for a command of the set of commands. An argument may define one or more inputs required to facilitate collecting the feature or debug data associated with the feature, hardware, or software. In some implementations, the network monitoring system may generate the one or more arguments for the command based on the one or more parameters of the command. For example, the network monitoring system may generate (e.g., using a configuration module of the network monitoring system, as shown in FIG. 1A) an argument for collecting data concerning a performance metric of the network device that includes at least one parameter, of the one or more parameters, associated with the performance metric.

As further shown in FIG. 1A, and by reference number 140, the network monitoring system may generate (e.g., using a configuration file generator module of the network monitoring system, as shown in FIG. 1A) a configuration file (e.g., that may be used by the network monitoring system to collect feature or debug data associated with the feature, hardware, or software, as described herein). The configuration file may include the respective arguments of the one or more commands that comprise the set of commands. For example, the network monitoring system may generate a configuration file (e.g., an initial, "blank" configuration file) and integrate each of the respective arguments of the one or more commands into the configuration file to generate an updated configuration file. As another example, the network monitoring system may identify an existing configuration file (e.g., based on searching, using an identifier associated with the feature, hardware, or software, a data structure that is configured to store configuration files) and generate a copy of the configuration file. Accordingly, the network monitoring system may integrate each of the respective arguments of the one or more commands in the copied configuration file. In some implementations, the network monitoring system may generate the configuration file to include and/or indicate the collection scheme.

In some implementations, the network monitoring system may store the configuration file (e.g., after causing the configuration file to include the respective arguments of the one or more commands that comprise the set of commands and/or the collection scheme) in the data structure configured to store configuration files. For example, the network monitoring system may process and/or analyze the request, the user input, and/or the configuration file (e.g., that includes the respective arguments of the one or more commands that comprise the set of commands and/or the collection scheme), among other examples, to identify the one or more tags (e.g., one or more classification terms) associated with the feature, hardware, or software. The network monitoring system may store the configuration file in association with an identifier of the feature, hardware, or software (e.g., a name or description of the feature, hardware, or software) and/or the one or more tags in the data structure (e.g., as an entry in the data structure that includes the identifier of the feature, hardware, or software, the one or more tags, and the configuration file as different elements of the entry).

Turning to FIG. 1B and reference number 150, the network monitoring system may receive a collection request associated with the feature, hardware, or software of the network device and/or the network (e.g., after the network monitoring system has generated the configuration file associated with the feature, hardware, or software). In some implementations, the network monitoring system may receive the collection request from another device (e.g., a user device that communicates with the network monitoring system). The collection request may include a request to collect the feature or debug data associated with the feature, hardware, or software. In some implementations, the collection request may include a description of the feature, hardware, or software and/or one or more tags associated with the feature, hardware, or software, among other examples.

As further shown in FIG. 1B, and by reference number 160, the network monitoring system may obtain the configuration file based on the collection request. For example, the network monitoring system may process and/or analyze the collection request to identify the description of the feature, hardware, or software and/or the one or more tags associated with the feature, hardware, or software. Accordingly, the network monitoring system may search, based on the description of the feature, hardware, or software and/or the one or more tags associated with the feature, hardware, or software, the data structure that stores the configuration files to obtain the configuration file.

Figure 1C:
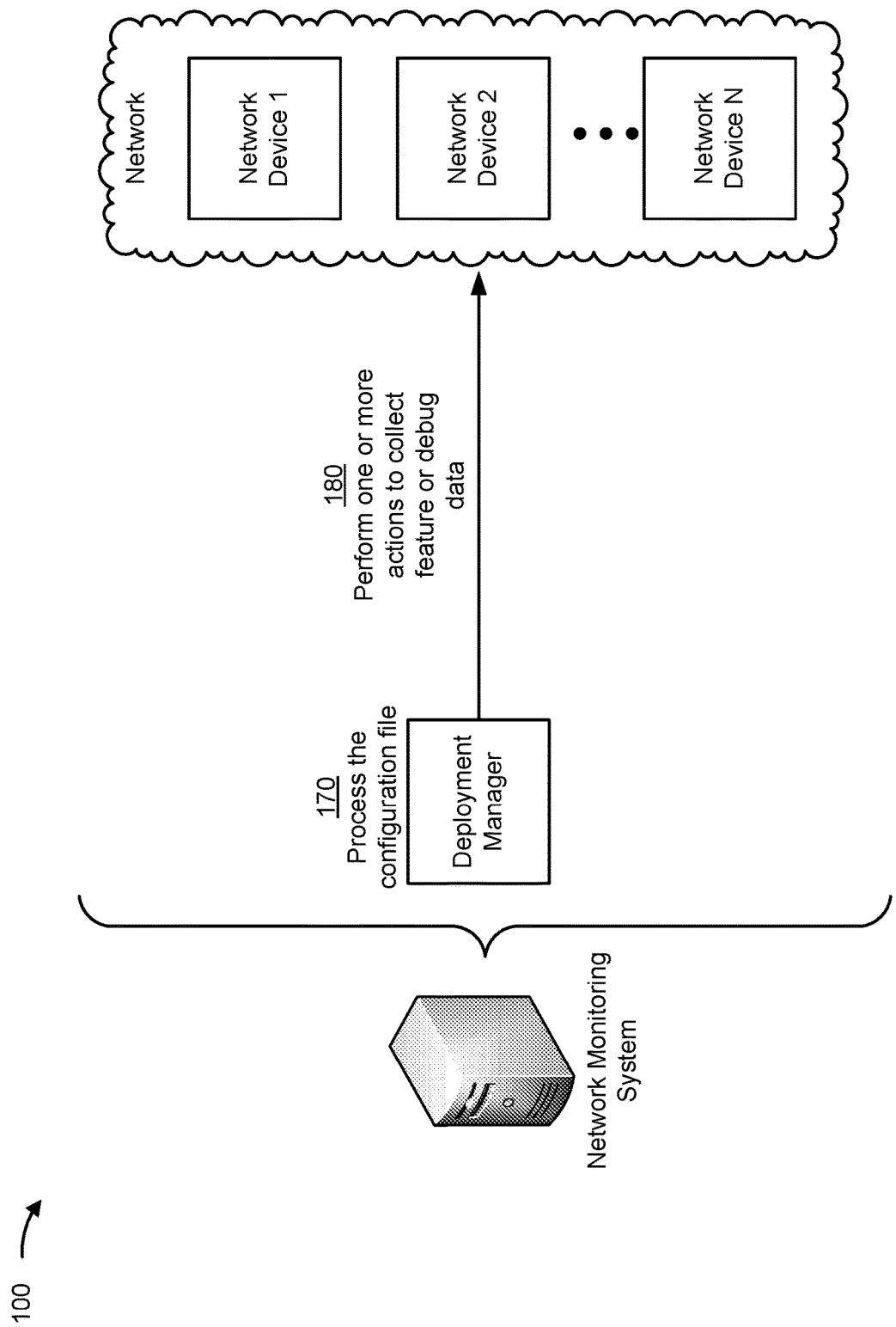

Turning to FIG. 1C and reference number 170, the network monitoring system may process the configuration file. For example, the network monitoring system may process the configuration file to generate one or more executable modules that may be run to collect the feature or debug data associated with the feature, hardware, or software.

In some implementations, when processing the configuration file, the network monitoring system may identify the set of commands that are included in the configuration file. The network monitoring system may identify for each command, of the set of commands, one or more arguments and may determine whether each of the one or more arguments is a required argument or optional argument. In some implementations, network monitoring system may identify for each command, of the set of commands, one or more parameters and may determine whether any of the one or more parameters is a multi-use parameter used by other commands of the set of commands and/or whether any of the one or more parameters includes a dynamic value (e.g., a regular expression for indicating a matching condition). In some implementations, the network monitoring system may identify the collection scheme included in the configuration file and determine one or more events for collecting the feature or debug data (e.g., a schedule to collect the feature or debug data, a number of times to collect the feature or debug data, and/or the like).

Accordingly, the network monitoring system may generate the one or more executable modules according to the required and/or optional arguments, the multi-use parameters, the parameters with dynamic values, and/or the one or more events, among other examples. In some implementations, the network monitoring system may generate the one or more executable modules based on the collection request, such that only executable modules that are relevant to the collection request are generated. In this way, the network monitoring system may prevent computing resources (e.g., processing resources, memory resources, power resources, and/or the like) of the network monitoring system from being used to generate unnecessary executable modules.

As further shown in FIG. 1C and by reference number 180, the network monitoring system may perform one or more actions to collect the feature or debug data associated with the feature, hardware, or software (e.g., based on the configuration file and/or the one or more executable modules). In some implementations, performing the one or more actions includes executing the one or more executable modules to cause the network monitoring system to collect the feature or debug data. For example, the network monitoring system may execute the one or more executable modules to cause the set of commands that are included in the configuration file to be run according to the collection scheme included in the configuration file. In this way, the network monitoring system may collect the feature or debug data associated with the feature, hardware, or software.

In some implementations, the network monitoring system may send the configuration file and/or the one or more executable modules to the network device associated with the feature, hardware, or software, to allow the network device to collect the feature or debug data associated with the feature, hardware, or software (e.g., by executing the one or more executable modules in a similar manner as that described above). Accordingly, the network device may send the feature or debug data to the network monitoring system (e.g., to allow the network monitoring system to collect the feature or debug data associated with the feature, hardware, or software).

In some implementations, the network monitoring system may store the feature or debug data in a data structure of the network monitoring system (e.g., as a file that includes the feature or debug data and additional identifying information, such as a timestamp indicating when the feature or debug data was collected). In some implementations, the network monitoring system, or another device, may access the data structure to obtain and process and/or analyze the feature or debug data.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
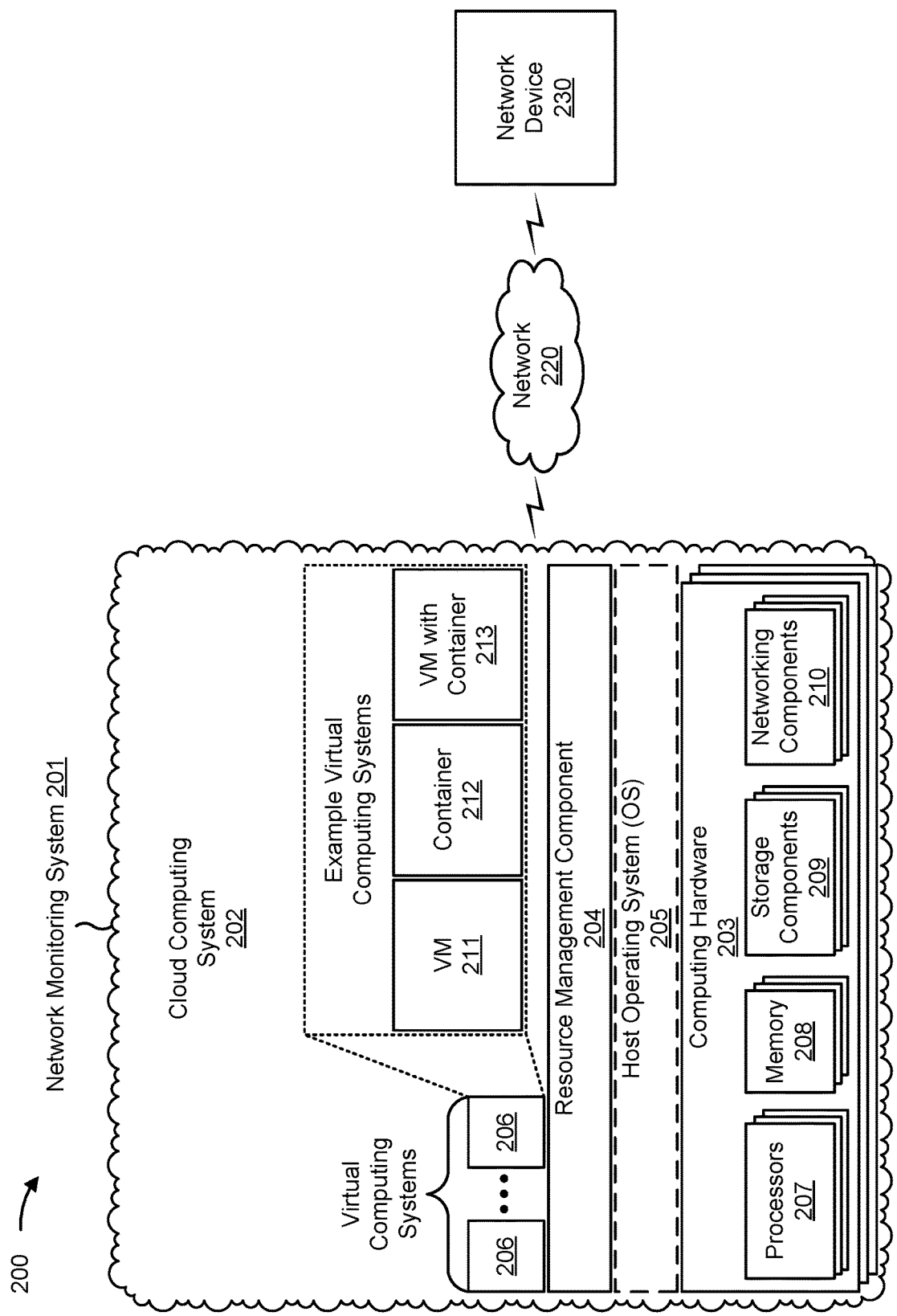
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network monitoring system 201, which may include one or more elements of and/or may execute within a cloud computing system 202. The cloud computing system 202 may include one or more elements 203-213, as described in more detail below. As further shown in FIG. 2, environment 200 may include a network 220, and/or a network device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the network monitoring system 201 may include one or more elements 203-213 of the cloud computing system 202, may execute within the cloud computing system 202, and/or may be hosted within the cloud computing system 202, in some implementations, the network monitoring system 201 may not be cloud-based (e.g., may be implemented outside of a cloud computing system) or may be partially cloud-based. For example, the network monitoring system 201 may include one or more devices that are not part of the cloud computing system 202, such as device 300 of FIG. 3 or device 400 of FIG. 4, which may include a standalone server or another type of computing device. The network monitoring system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The network device 230 includes one or more devices capable of receiving, processing, storing, routing, and/or providing traffic (e.g., a packet, other information or metadata, and/or the like) in a manner described herein. For example, the network device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, the network device 230 may include a gateway, a switch, a firewall, a hub, a bridge, a reverse proxy, a server (e.g., a proxy server, a cloud server, a data center server, and/or the like), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, the network device 230 may be associated with a feature, hardware, or software and the network device 230 and/or the network monitoring system 201 may collect feature or debug data associated with the feature, hardware, or software based on a configuration file generated by the network monitoring system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
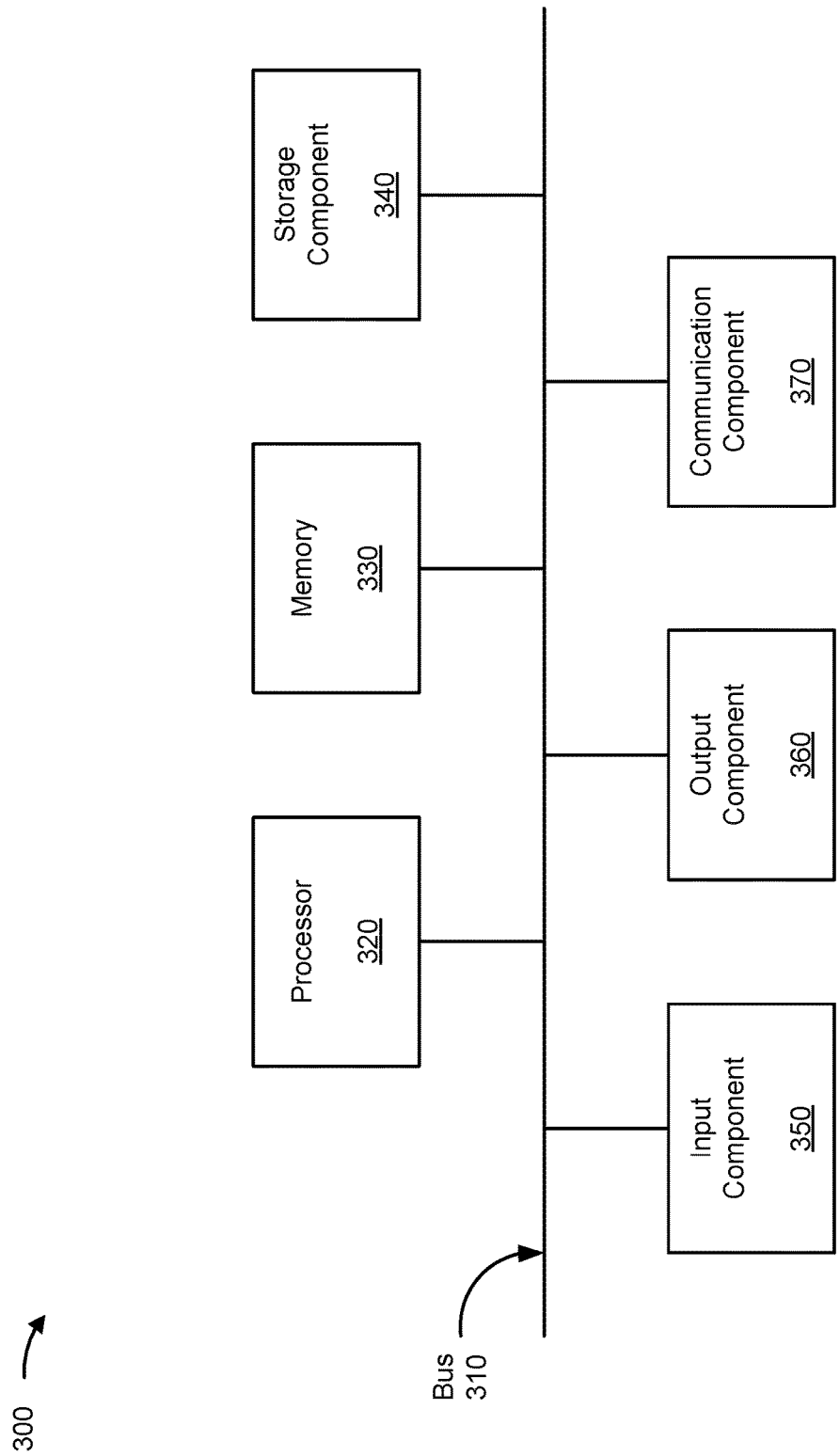
FIGS. 3-4 are diagrams of example components of one or more devices of FIG. 2.

FIG. 3 is a diagram of example components of a device 300, which may correspond to network monitoring system 201, computing hardware 203, and/or network device 230, among other examples. In some implementations, network monitoring system 201, computing hardware 203, and/or network device 230, among other examples, may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
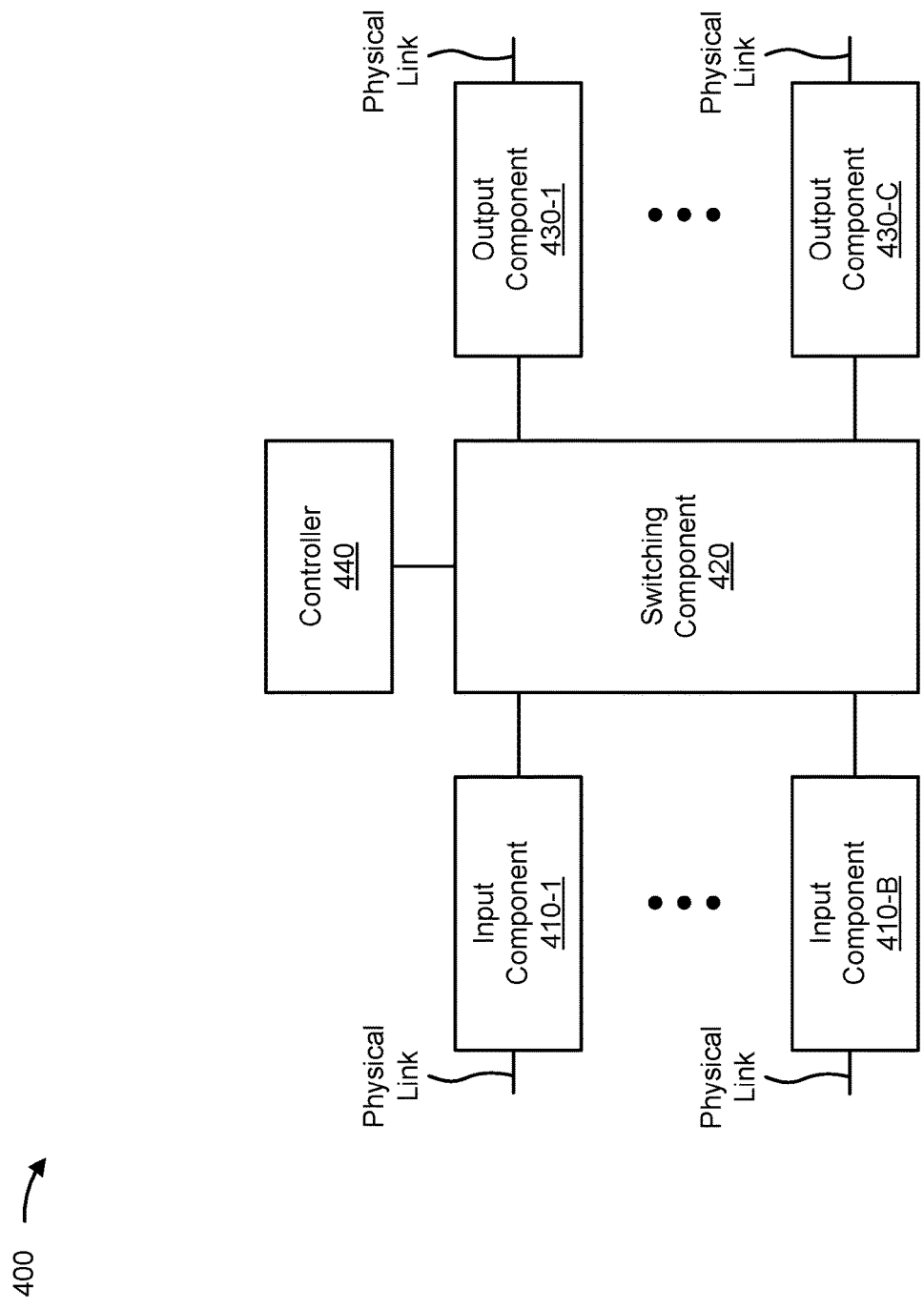

FIG. 4 is a diagram of example components of a device 400. Device 400 may correspond to network monitoring system 201, computing hardware 203, and/or network device 230, among other examples. In some implementations, network monitoring system 201, computing hardware 203, and/or network device 230, among other examples, may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
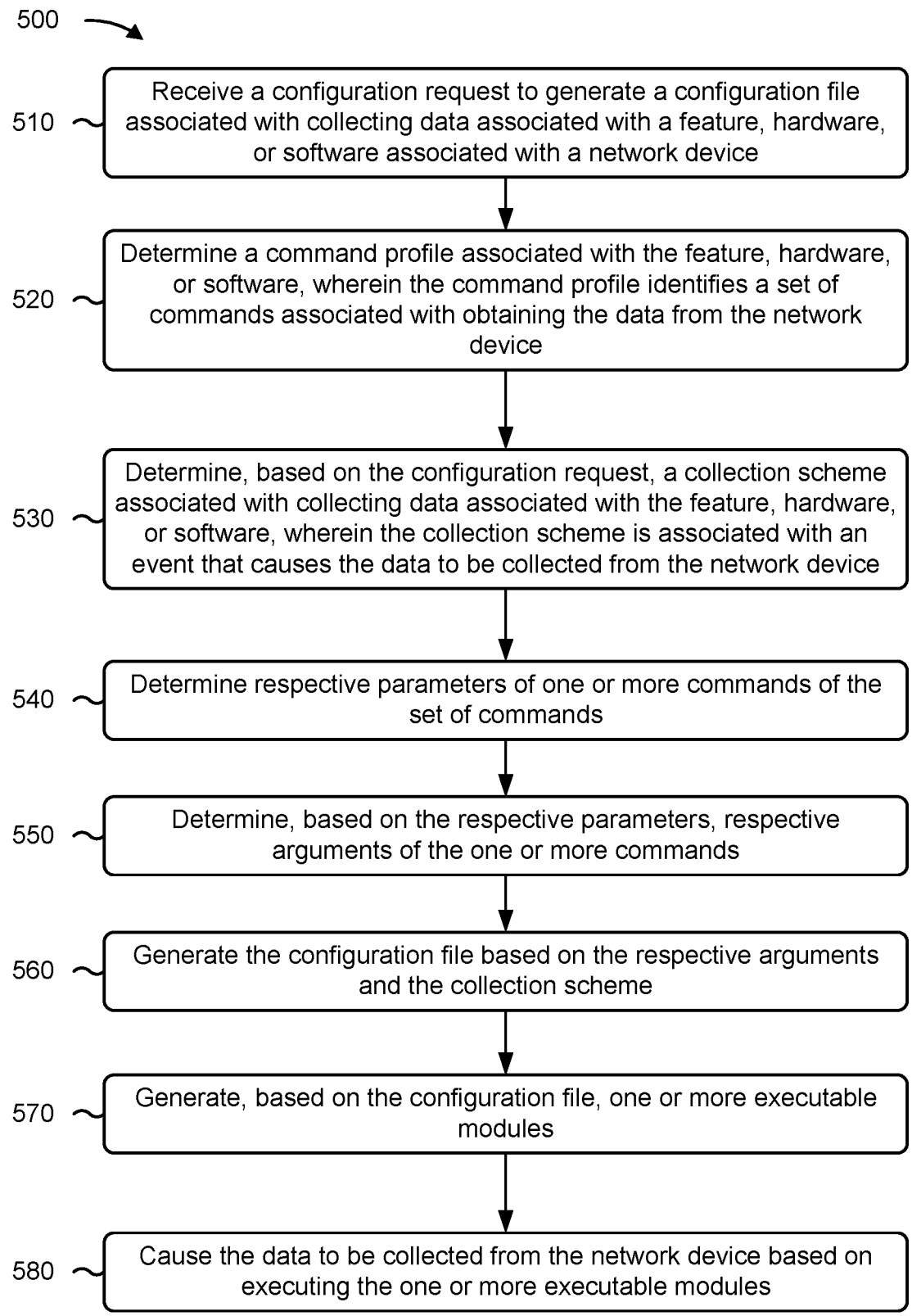
FIGS. 5-7 are flowcharts of example processes relating to data collection configuration file generation

FIG. 5 is a flowchart of an example process 500 associated with data collection configuration file generation. In some implementations, one or more process blocks of FIG. 5 may be performed by a device (e.g., network monitoring system 201). In some implementations, one or more process blocks of FIG. 5 may be performed by another device or a group of devices separate from or including the device, such as a network device (e.g., network device 230). Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 5, process 500 may include receiving a configuration request to generate a configuration file associated with collecting feature or debug data associated with a feature, hardware, or software associated with a network device (block 510). For example, the device may receive a configuration request to generate a configuration file associated with collecting feature or debug data associated with a feature, hardware, or software associated with a network device, as described above.

As further shown in FIG. 5, process 500 may include determining a command profile associated with the feature, hardware, or software, wherein the command profile identifies a set of commands associated with obtaining the feature or debug data from the network device (block 520). For example, the device may determine a command profile associated with the feature, hardware, or software, as described above. In some implementations, the command profile identifies a set of commands associated with obtaining the feature or debug data from the network device.

As further shown in FIG. 5, process 500 may include determining, based on the configuration request, a collection scheme associated with collecting feature or debug data associated with the feature, hardware, or software, wherein the collection scheme is associated with an event that causes the feature or debug data to be collected from the network device (block 530). For example, the device may determine, based on the configuration request, a collection scheme associated with collecting feature or debug data associated with the feature, hardware, or software. In some implementations, the collection scheme is associated with an event that causes the feature or debug data to be collected from the network device.

As further shown in FIG. 5, process 500 may include determining respective parameters of one or more commands of the set of commands (block 540). For example, the device may determine respective parameters of one or more commands of the set of commands, as described above.

As further shown in FIG. 5, process 500 may include determining, based on the respective parameters, respective arguments of the one or more commands (block 550). For example, the device may determine, based on the respective parameters, respective arguments of the one or more commands, as described above.

As further shown in FIG. 5, process 500 may include generating the configuration file based on the respective arguments and the collection scheme (block 560). For example, the device may generate the configuration file based on the respective arguments and the collection scheme, as described above.

As further shown in FIG. 5, process 500 may include generating, based on the configuration file, one or more executable modules (block 570). For example, the device may generate, based on the configuration file, one or more executable modules, as described above.

As further shown in FIG. 5, process 500 may include causing the feature or debug data to be collected from the network device based on executing the one or more executable modules (block 580). For example, the device may cause the feature or debug data to be collected from the network device based on executing the one or more executable modules, as described above.

Process 500 may include additional implementations, such as any single implementation or any combination of implementations described below and/or in connection with one or more other processes described elsewhere herein.

In a first implementation, the configuration request is received in association with a user input that includes a description of the feature, hardware, or software, wherein the command profile is determined based on an analysis of the description of the feature, hardware, or software.

In a second implementation, alone or in combination with the first implementation, determining the command profile comprises identifying, from the configuration request, one or more characteristics of the feature, hardware, or software that are described in the configuration request, wherein the one or more characteristics correspond to the respective parameters, and determining, based on the one or more characteristics, the set of commands.

In a third implementation, alone or in combination with one or more of the first and second implementations, the configuration request is received in association with a user input that includes a description of the event, and the collection scheme is determined based on an analysis of the description of the event.

In a fourth implementation, alone or in combination with one or more of the first through third implementations, the event comprises a scheduled event that is associated with a schedule for collecting the feature or debug data.

In a fifth implementation, alone or in combination with one or more of the first through fourth implementations, the event is associated with the network device operating under a particular condition.

In a sixth implementation, alone or in combination with one or more of the first through fifth implementations, process 500 includes, prior to performing the action, determining, based on the configuration request, one or more tags associated with the feature, hardware, or software, and storing the configuration file in association with an identifier of the feature, hardware, or software and the one or more tags.

In a seventh implementation, alone or in combination with one or more of the first through sixth implementations, generating the one or more executable modules comprises identifying a plurality of commands included in the configuration file; identifying, based on the plurality of commands, executable information that includes at least one of: one or more required arguments, one or more optional arguments, one or more multi-use parameters, one or more dynamic value parameters, or one or more events for collecting the feature or debug data; and generating the one or more executable modules based on the executable information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
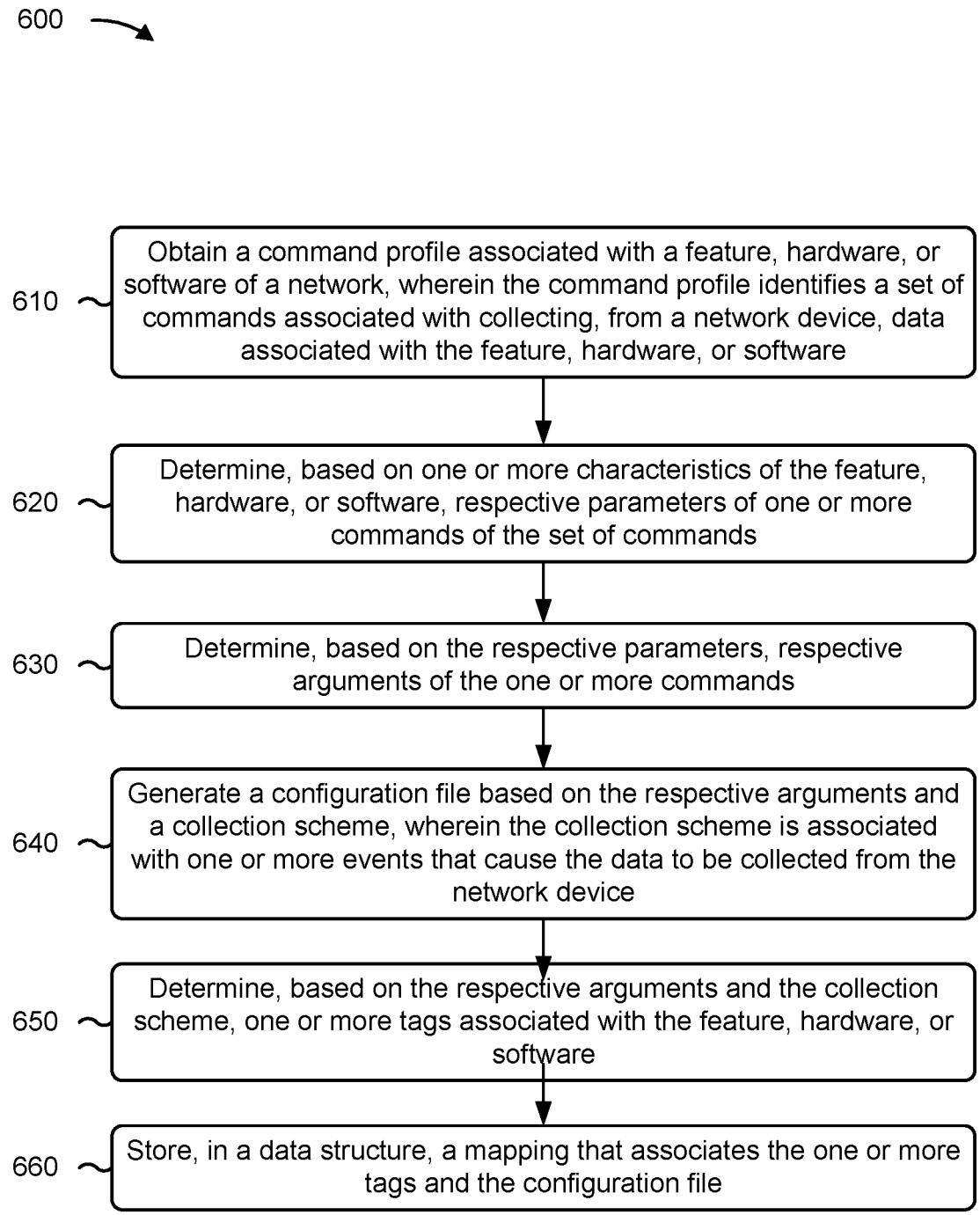

FIG. 6 is a flowchart of an example process 600 associated with data collection configuration file generation. In some implementations, one or more process blocks of FIG. 6 may be performed by a device (e.g., network monitoring system 201). In some implementations, one or more process blocks of FIG. 6 may be performed by another device or a group of devices separate from or including the device, such as a network device (e.g., network device 230). Additionally, or alternatively, one or more process blocks of FIG. 6 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 6, process 600 may include obtaining a command profile associated with a feature, hardware, or software of a network; wherein the command profile identifies a set of commands associated with collecting, from a network device, feature or debug data associated with the feature, hardware, or software (block 610). For example, the device may obtain a command profile associated with a feature, hardware, or software of a network, as described above. In some implementations, the command profile identifies a set of commands associated with collecting, from a network device, feature or debug data associated with the feature, hardware, or software.

As further shown in FIG. 6, process 600 may include determining, based on one or more characteristics of the feature, hardware, or software, respective parameters of one or more commands of the set of commands (block 620). For example, the device may determine, based on one or more characteristics of the feature, hardware, or software, respective parameters of one or more commands of the set of commands, as described above.

As further shown in FIG. 6, process 600 may include determining, based on the respective parameters, respective arguments of the one or more commands (block 630). For example, the device may determine, based on the respective parameters, respective arguments of the one or more commands, as described above.

As further shown in FIG. 6, process 600 may include generating a configuration file based on the respective arguments and a collection scheme, wherein the collection scheme is associated with one or more events that cause the feature or debug data to be collected from the network device (block 640). For example, the device may generate a configuration file based on the respective arguments and a collection scheme, as described above. In some implementations, the collection scheme is associated with one or more events that cause the feature or debug data to be collected from the network device.

As further shown in FIG. 6, process 600 may include determining, based on the respective arguments and the collection scheme, one or more tags associated with the feature, hardware, or software (block 650). For example, the device may determine, based on the respective arguments and the collection scheme, one or more tags associated with the feature, hardware, or software, as described above.

As further shown in FIG. 6, process 600 may include storing, in a data structure, a mapping that associates the one or more tags and the configuration file (block 660). For example, the device may store, in a data structure, a mapping that associates the one or more tags and the configuration file, as described above.

Process 600 may include additional implementations, such as any single implementation or any combination of implementations described below and/or in connection with one or more other processes described elsewhere herein.

In a first implementation, the feature, hardware, or software comprises at least one of: a particular type of network device, a particular type of service provided by the network device, a particular type of network operation performed by the network device, a particular type of network metric associated with a performance of the network device; or a set of data required for troubleshooting an error, an event, or a symptom.

In a second implementation, alone or in combination with the first implementation, the command profile is obtained in association with a user input that identifies the one or more characteristics.

In a third implementation, alone or in combination with one or more of the first and second implementations, at least one of the one or more events comprises a scheduled event that is associated with a schedule for collecting the feature or debug data from the network device, or an unscheduled event that is associated with the network device operating under a particular condition.

In a fourth implementation, alone or in combination with one or more of the first through third implementations, the one or more tags associated with the feature, hardware, or software are determined based on a user input provided in association with the command profile.

In a fifth implementation, alone or in combination with one or more of the first through fourth implementations, process 600 includes receiving a collection request, determining that the collection request is associated with the feature, hardware, or software, obtaining the configuration file from the data structure, generating, based on the collection request and the configuration file, one or more executable modules, and collecting the feature or debug data from the network device or another network device of the network based on the one or more executable modules.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
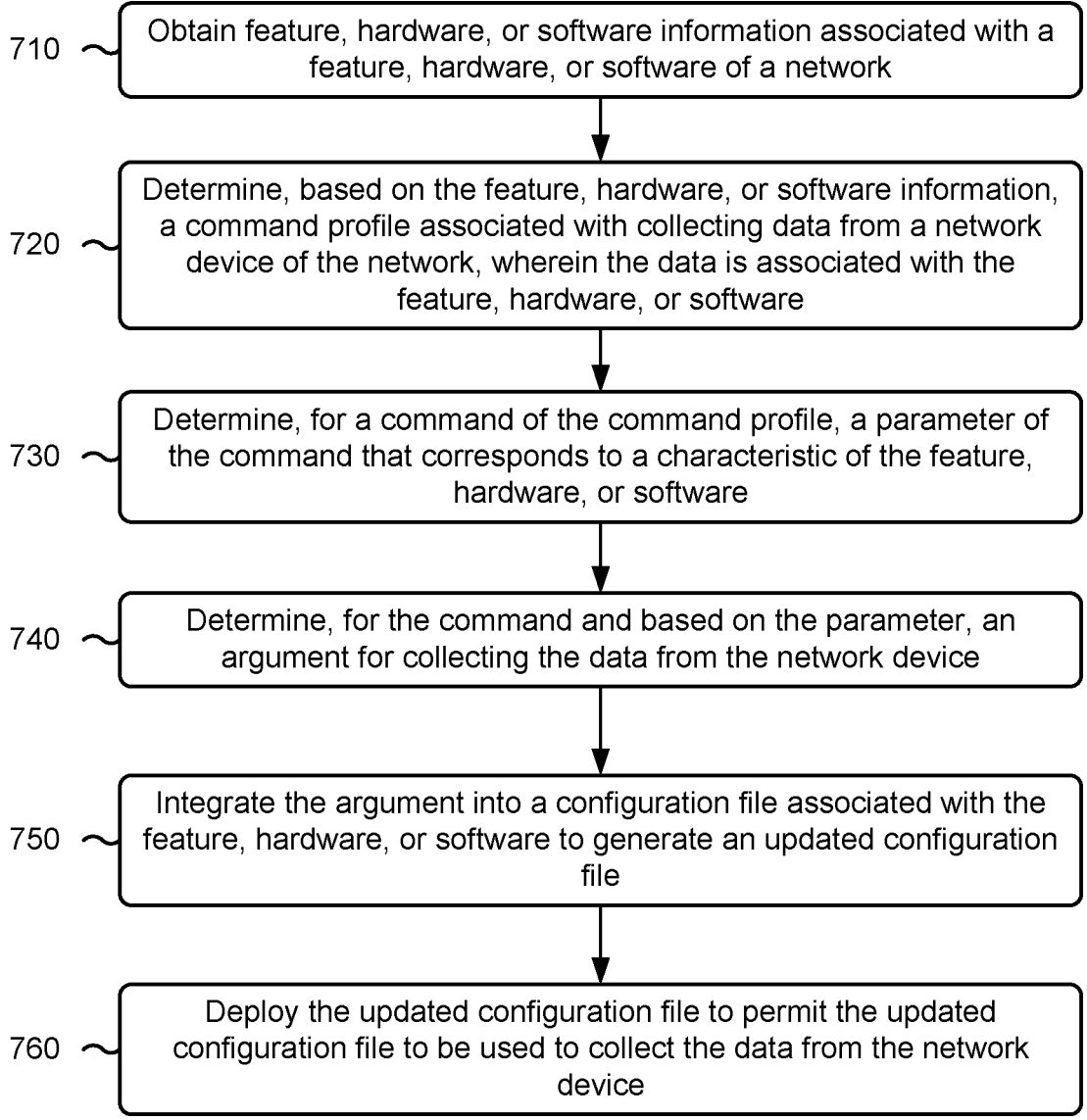

FIG. 7 is a flowchart of an example process 700 associated with data collection configuration file generation. In some implementations, one or more process blocks of FIG. 7 may be performed by a device (e.g., network monitoring system 201). In some implementations, one or more process blocks of FIG. 6 may be performed by another device or a group of devices separate from or including the device, such as a network device (e.g., network device 230). Additionally, or alternatively, one or more process blocks of FIG. 7 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 7, process 700 may include obtaining feature, hardware, or software information associated with a feature, hardware, or software of a network (block 710). For example, the device may obtain feature, hardware, or software information associated with a feature, hardware, or software of a network, as described above.

As further shown in FIG. 7, process 700 may include determining, based on the feature, hardware, or software information, a command profile associated with collecting feature or debug data from a network device of the network, wherein the feature or debug data is associated with the feature, hardware, or software (block 720). For example, the device may determine, based on the feature, hardware, or software information, a command profile associated with collecting feature or debug data from a network device of the network, as described above. In some implementations, the feature or debug data is associated with the feature, hardware, or software.

As further shown in FIG. 7, process 700 may include determining, for a command of the command profile, a parameter of the command that corresponds to a characteristic of the feature, hardware, or software (block 730). For example, the device may determine, for a command of the command profile, a parameter of the command that corresponds to a characteristic of the feature, hardware, or software, as described above.

As further shown in FIG. 7, process 700 may include determining, for the command and based on the parameter, an argument for collecting the feature or debug data from the network device (block 740). For example, the device may determine, for the command and based on the parameter, an argument for collecting the feature or debug data from the network device, as described above.

As further shown in FIG. 7, process 700 may include integrating the argument into a configuration file associated with the feature, hardware, or software to generate an updated configuration file (block 750). For example, the device may integrate the argument into a configuration file associated with the feature, hardware, or software to generate an updated configuration file, as described above.

As further shown in FIG. 7, process 700 may include deploying the updated configuration file to permit the updated configuration file to be used to collect the feature or debug data from the network device (block 760). For example, the device may deploy the updated configuration file to permit the configuration file to be used to collect the feature or debug data from the network device, as described above.

Process 700 may include additional implementations, such as any single implementation or any combination of implementations described below and/or in connection with one or more other processes described elsewhere herein.

In a first implementation, the feature, hardware, or software information comprises at least one of a document that describes the network device, a guide associated with interacting with the network device, or a user input that includes a description of the feature, hardware, or software.

In a second implementation, alone or in combination with the first implementation, process 700 includes, prior to integrating the argument into the configuration file, determining, based on the argument and the feature, hardware, or software information, a collection scheme for collecting the feature or debug data, wherein the collection scheme includes at least one of a schedule for collecting the feature or debug data, or an event associated with triggering collection of the feature or debug data.

In a third implementation, alone or in combination with one or more of the first and second implementations, integrating the argument into the configuration file includes identifying the configuration file based on the configuration file being mapped to an identifier of the feature, hardware, or software in a data structure, generating a copy of the configuration file, and integrating the argument into the copy of the configuration file, wherein the updated configuration file corresponds to the copy of the configuration file.

In a fourth implementation, alone or in combination with one or more of the first through third implementations, causing the device to deploy the updated configuration file includes generating one or more executable modules based on the configuration file; and executing the one or more executable modules, or sending the configuration file to the network device to allow the network device to execute the one or more executable modules.

In a fifth implementation, alone or in combination with one or more of the first through fourth implementations, deploying the updated configuration file includes storing the updated configuration file, in association with an identifier of the feature, hardware, or software, in a data structure, or transmitting, to the network device, the updated configuration file to cause the network device to use the updated configuration file to collect the feature or debug data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a configuration request to generate a configuration file associated with collecting debug data associated with a feature, hardware, or software associated with a network device;
determining, by the device, a command profile associated with the feature, hardware, or software,
wherein the command profile identifies a set of commands associated with obtaining the debug data from the network device;

determining, by the device and based on the configuration request, a collection scheme associated with collecting debug data associated with the feature, hardware, or software,
   wherein the collection scheme indicates an event that causes the debug data to be collected from the network device;
determining, by the device, respective parameters of one or more commands of the set of commands,
   wherein a parameter, of the respective parameters, is associated with a performance metric of the network device;
determining, by the device and based on the respective parameters, respective arguments of the one or more commands;
obtaining, by the device, an initial configuration file;
generating, by the device, the configuration file based on the configuration request and the respective arguments of the one or more commands and the collection scheme,
   wherein generating the configuration file comprises:
      generating the configuration file by including each of the respective arguments of the one or more commands and the collection scheme into the initial configuration file;
generating, based on the configuration file, one or more executable modules to be run according to the collection scheme in the configuration file; and
causing the debug data to be collected from the network device based on executing the one or more executable modules.

2. The method of claim 1, wherein the configuration request is received in association with a user input that includes a description of the feature, hardware, or software,
   wherein the command profile is determined based on an analysis of the description of the feature, hardware, or software.

3. The method of claim 1, wherein determining the command profile comprises:
   identifying, from the configuration request, one or more characteristics of the feature, hardware, or software that are described in the configuration request,
      wherein the one or more characteristics correspond to the respective parameters; and
   determining, based on the one or more characteristics, the set of commands.

4. The method of claim 1, wherein the configuration request is received in association with a user input that includes a description of the event, and
   wherein the collection scheme is determined based on an analysis of the description of the event.

5. The method of claim 1, wherein the event comprises a scheduled event that is associated with a schedule for collecting the debug data.

6. The method of claim 1, wherein the event is associated with the network device operating under a particular condition.

7. The method of claim 1, further comprising:
   determining, based on the configuration request, one or more tags associated with the feature, hardware, or software, and
   storing the configuration file in association with an identifier of the feature, hardware, or software and the one or more tags.

8. The method of claim 1, wherein generating the one or more executable modules comprises:
   identifying a plurality of commands included in the configuration file;
   identifying, based on the plurality of commands, executable information that includes at least one of:
      one or more required arguments,
      one or more optional arguments,
      one or more multi-use parameters,
      one or more dynamic value parameters, or
      one or more events for collecting the debug data; and
   generating the one or more executable modules based on the executable information.

9. A device, comprising:
one or more memories; and
one or more processors to:
   obtain a command profile associated with a feature, hardware, or software of a network,
      wherein the command profile identifies a set of commands associated with collecting, from a network device, debug data associated with the feature, hardware, or software;
   determine, based on one or more characteristics of the feature, hardware, or software, respective parameters of one or more commands of the set of commands;
   determine, based on the respective parameters, respective arguments of the one or more commands,
      wherein a parameter, of the respective parameters, is associated with a performance metric of the network device;
   obtain an initial configuration file;
   generate a configuration file based on the configuration file and the respective arguments of the one or more commands and a collection scheme,
      wherein the collection scheme indicates one or more events that cause the debug data to be collected from the network device, and
      wherein the one or more processors, when generating the configuration file, are to:
         generate the configuration file by including each of the respective arguments of the one or more commands and the collection scheme into the initial configuration file;
   determine, based on the respective arguments and the collection scheme, one or more tags associated with the feature, hardware, or software; and
   store, in a data structure, a mapping that associates the one or more tags and the configuration file.

10. The device of claim 9, wherein the feature, hardware, or software comprises at least one of:
   a particular type of network device;
   a particular type of service provided by the network device;
   a particular type of network operation performed by the network device;
   a particular type of network metric associated with a performance of the network device; or
   a set of data required for troubleshooting an error, an event, or a symptom.

11. The device of claim 9, wherein the command profile is obtained in association with a user input that identifies the one or more characteristics.

12. The device of claim 9, wherein at least one of the one or more events comprises:
   a scheduled event that is associated with a schedule for collecting the debug data from the network device; or
   an unscheduled event that is associated with the network device operating under a particular condition.

13. The device of claim 9, wherein the one or more tags associated with the feature, hardware, or software are determined based on a user input provided in association with the command profile.

14. The device of claim 9, wherein the one or more processors are further to:
receive a collection request;
determine that the collection request is associated with the feature, hardware, or software;
obtain the configuration file from the data structure;
generate, based on the collection request and the configuration file, one or more executable modules; and
collect the debug data from the network device or another network device of the network based on the one or more executable modules.

15. A non-transitory computer-readable medium storing a set of instructions, the set of instructions comprising:
one or more instructions that, when executed by one or more processors of a device, cause the device to:
obtain feature, hardware, or software information associated with a feature, hardware, or software of a network;
determine, based on the feature, hardware, or software information, a command profile associated with debug data from a network device of the network, wherein the debug data is associated with the feature, hardware, or software;
determine, for a command of the command profile, a parameter of the command that corresponds to a characteristic of the feature, hardware, or software;
determine, for the command and based on the parameter, an argument for collecting the debug data from the network device,
wherein the parameter is associated with a performance metric of the network device;
obtain an initial configuration file associated with the feature, hardware, or software;
include the argument and an event associated with triggering collection of the debug data into the initial configuration file to generate an updated configuration file; and
deploy the updated configuration file to permit the updated configuration file to be used to collect the debug data from the network device.

16. The non-transitory computer-readable medium of claim 15, wherein the feature, hardware, or software information comprises at least one of:
a document that describes the network device,
a guide associated with interacting with the network device, or
a user input that includes a description of the feature, hardware, or software.

17. The non-transitory computer-readable medium of claim 15, wherein the one or more instructions, when executed by the one or more processors, further cause the device to:
prior to integrating the argument into the initial configuration file, determine, based on the argument and the feature, hardware, or software information, a collection scheme for collecting the debug data,
wherein the collection scheme includes
the event associated with triggering collection of the debug data.

18. The non-transitory computer-readable medium of claim 15, wherein the one or more instructions that cause the device to include the argument into the initial configuration file, cause the device to:
identify the configuration file based on the configuration file being mapped to an identifier of the feature, hardware, or software in a data structure;
generate a copy of the initial configuration file; and
include the argument into the copy of the initial configuration file,
wherein the updated configuration file corresponds to the copy of the initial configuration file.

19. The non-transitory computer-readable medium of claim 15, wherein the one or more instructions that cause the device to deploy the updated configuration file, cause the device to:
generate one or more executable modules based on the initial configuration file; and
execute the one or more executable modules; or
send the one or more executable modules to the network device to allow the network device to execute the one or more executable modules.

20. The non-transitory computer-readable medium of claim 15, wherein the one or more instructions, that cause the device to deploy the updated configuration file, cause the device to:
store the updated configuration file, in association with an identifier of the feature, hardware, or software, in a data structure; or
transmit, to the network device, the updated configuration file to cause the network device to use the updated configuration file to collect the debug data.

* * * * *